(No Model.)
H. V. REED.
AGITATING ROTARY DRIER.
No. 368,237. Patented Aug. 16, 1887.
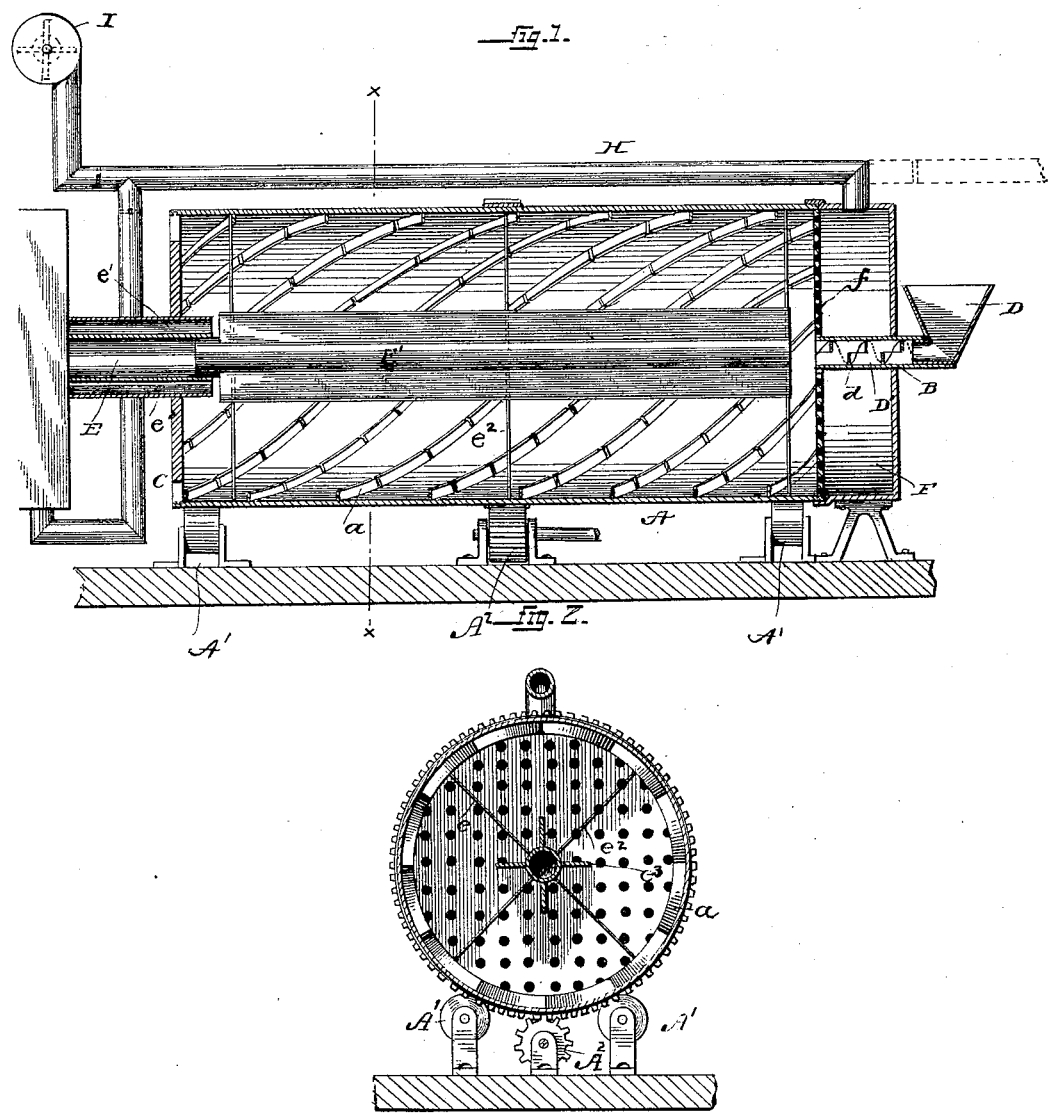
Witnesses:
N. W. Mortimer
David H. Mead
Inventor:
Hiram V. Reed,
by R. J. Dyrenforth,
his Attorney

UNITED STATES PATENT OFFICE.

HIRAM V. REED, OF CHICAGO, ILLINOIS.

AGITATING ROTARY DRIER.

SPECIFICATION forming part of Letters Patent No. 368,237, dated August 16, 1887.

Application filed March 30, 1886. Serial No. 197,189. (No model.)

*To all whom it may concern:*

Be it known that I, HIRAM V. REED, a citizen of the United States, residing at Chicago, in the county of Cook and State of Illinois, have invented certain new and useful Improvements in Agitating Rotary Driers; and I do hereby declare the following to be a full, clear, and exact description of the invention, such as will enable others skilled in the art to which it appertains to make and use the same.

This invention relates to rotary driers, particularly of the class intended for the treatment of comminuted substances, such as brewers' grains and the like.

The object is to dry substances with great rapidity and effectiveness and with greater economy of the drying medium than heretofore; also, to produce an apparatus which shall at once be simple, be of ready construction, and be efficient in operation.

With these objects in view my invention consists, essentially, in a rotary cylinder provided with suitable inlet and outlet openings for the admission and discharge of the substance or material to be treated, the said cylinder being provided with suitable conduits for introducing hot air into it at two points, one at the point where the substance is nearly or quite dry and is about to be discharged and the other at the point where the material contains the most moisture—that is, where it is first introduced into the drying-cylinder.

Furthermore, the invention consists in the combination, with a rotary cylinder having on its interior spirally-arranged ribs, of pipes arranged in its longitudinal axis and discharging at different points in its interior, one pipe being provided with radial wings or flanges, whereby the material is moved forward and scattered, and the drying is facilitated both by the scattering about of the material and by conduction of heat to the same from the pipe while the material rests in its flanges.

In the accompanying drawings, forming part of this specification, and in which like letters of reference indicate corresponding parts, Figure 1 is a central longitudinal sectional view of a drying apparatus, illustrating an embodiment of my invention, showing the rotary cylinder having suitable inlet and outlet openings for the admission and discharge of the substance to be treated, showing the conduits for the introduction of heated air near the point of discharge and at the point of introduction of the material under treatment, and showing the collection-chamber and the pipes for conveying the sodden air from the collection-chamber to a furnace or elsewhere. Fig. 2 is a view in cross-section taken on the line *x x* of Fig. 1, showing means of supporting the conduit which supplies heated air to the point where the material is introduced, showing radial wings or flanges upon this pipe to assist in scattering the material during treatment and to hold the same from time to time upon the hot pipe, showing the perforated plate between the end of the cylinder and the collection-chamber, and showing the means of imparting rotary motion to the cylinder.

In the drawings, A represents the cylinder, which is preferably of sheet metal, and is so arranged and connected with driving mechanism as to be capable of rotation for the purpose of moving forward and agitating the substance to be dried.

The cylinder is shown as supported upon small wheels or anti-friction rollers A′ and as rotated upon these by a gear-wheel, A², which is on a driving-shaft and meshes with teeth upon the circumference of the cylinder. It is obvious, however, that the cylinder may be rotated in any other suitable manner, since the particular means of rotating the cylinder are of no importance, so far as the present invention is concerned.

The cylinder A is provided at one end with an inlet, B, for the material to be dried, and has at the other end an outlet, C, for the dried material. The material to be dried is fed to the cylinder from a hopper, D, through a pipe, D′, by a screw-conveyer, *d*, placed in the pipe and preferably constructed to insure a regular feed into the cylinder.

In order to facilitate the thorough disintegration of the substance to be dried, to scatter it thoroughly, in order to present all parts of it to the absorbent fluid, and to insure dissipation to the utmost of all watery vapor by it carried, and at the same time to convey it slowly from the inlet end of the cylinder to the outlet end thereof, the interior of the cylinder is provided with spiral ribs or flanges *a*, which have the effect both of scattering the mass and of moving it onward, and the operation of these ribs is assisted, so far as the disintegration and presentation for favorable condition of drying is concerned, by radial wings or flanges upon a body at the interior of the cylinder, as will be described more particularly further on.

In practice it has been found advantageous to introduce hot air, by which the drying is accomplished, at that end of a cylinder from which a substance under treatment is about to be discharged, for the reason that when the substance has reached that point it is nearly dried, and any moisture that it would still retain when driven out here is carried back to that portion of the substance which, being more recently introduced and consequently damp, could not be injuriously affected by any additional charge of moisture. It has also been found advantageous partly to dry the substance under treatment immediately upon its introduction into the drying-cylinder; but it is an essential point of the present invention to perform both these operations simultaneously, and the following apparatus will serve as an illustration of how this performance may be carried into effect.

E represents a double pipe, consisting of an outer portion, $e$, and an inner portion, $e'$. The outer portion, $e$, conducts air from a suitable heating apparatus to a point within the cylinder A a short distance from the discharge-opening. The air introduced at this point passes on through and over the mass, and enters collection-chamber F through a perforated plate or a screen, $f$, the openings of which are of such size as to permit the free passage of an aeriform fluid, but prevent the passage of any particles of the solid substance under treatment, and so keep this from entering the collection-chamber. The inner portion, $e'$, also conducts air from a suitable heating apparatus into the cylinder A, but to a point close to the opening through which the substance to be treated is introduced, so that a large portion of the moisture carried by the substance is immediately driven out of it and at once passes to the collection-chamber. This inner portion, $e'$, of the double pipe passes through the outer pipe, $e$, and at its exit therefrom joins a pipe, E', which is secured at the longitudinal axis of the cylinder by means of suitable braces, $e^2$, and so revolves therewith. The junction between the pipes $e'$ and E' is such as to allow the latter to revolve freely and at the same time preserve quite a tight joint between the pipes.

The exterior of the pipe E' is provided with radial wings or flanges $e^3$, which, when the cylinder is revolved, assist the ribs $a$ in disintegrating or scattering the mass under treatment, and at the same time present between them small bodies or receptacles upon which the substance under treatment will lie and be heated by conduction from the pipe E', additionally to assist in dissipating the moisture in it contained.

The heated air, after passing through and over the material or substance to be dried and into the collection-chamber F, enters a suitable pipe, H, and is discharged either into a chimney or flue, into the furnace by which the air for drying is heated, into that by which steam is generated to impart the necessary motion to the cylinder, or into some other, as may be desired, so that the vapors, &c., which have been absorbed by the air from the mass under treatment can be carried off beyond offensiveness, or be destroyed by the fire of a furnace, at once serving to increase the heating capacity thereof, and also economizing fuel.

In order to promote the draft in the discharge-pipe a fan may be provided, by which the moisture-laden or sodden air is more rapidly conveyed from the chamber and the requisite draft of heated air through the cylinder is insured.

Having thus fully described my invention, what I claim, and desire to secure by Letters Patent, is—

1. The combination, with a rotary cylinder provided with suitable inlet for a substance or material to be dried and with suitable outlet for the same after drying, of two conduits for introducing hot air into the cylinder, one discharging near the exit—that is, near the point where the substance or material under treatment is nearly or quite dry—and the other discharging at the entrance—that is, at the point where the material to be treated is first introduced into the drying-cylinder—substantially as described.

2. The combination, with a rotary drying-cylinder provided with a suitable inlet and outlet for the admission and discharge of material under treatment, of a conduit for conveying hot air into the cylinder and a conduit for conveying hot air through it, the latter conduit revolving with the cylinder and provided with radial wings or flanges, substantially as and for the purpose described.

In testimony whereof I affix my signature in presence of two witnesses.

HIRAM V. REED.

Witnesses:
R. G. DYRENFORTH,
W. W. MORTIMER.